(12) United States Patent
Morley (10) Patent No.: US 12,496,620 B2
(45) Date of Patent: Dec. 16, 2025

(54) FRUIT SORTING EQUIPMENT

(71) Applicant: Ottimo Design Pty Ltd, Buninyong (AU)

(72) Inventor: Bruce Thomas Morley, Buninyong (AU)

(73) Assignee: Ottimo Design Pty Ltd (AU)

( * ) Notice: Subject to any disclaimer, the term of this patent is extended or adjusted under 35 U.S.C. 154(b) by 64 days.

(21) Appl. No.: 18/566,739

(22) PCT Filed: Jun. 16, 2022

(86) PCT No.: PCT/AU2022/050597
§ 371 (c)(1),
(2) Date: Dec. 4, 2023

(87) PCT Pub. No.: WO2022/261710
PCT Pub. Date: Dec. 22, 2022

(65) Prior Publication Data
US 2024/0261825 A1    Aug. 8, 2024

(30) Foreign Application Priority Data
Jun. 18, 2021    (AU) ................................ 2021901839

(51) Int. Cl.
*B07C 5/36* (2006.01)
*B07C 5/342* (2006.01)
(Continued)

(52) U.S. Cl.
CPC ............... *B07C 5/36* (2013.01); *B07C 5/342* (2013.01); *B65G 17/16* (2013.01); *B65G 17/24* (2013.01);
(Continued)

(58) Field of Classification Search
CPC ..... B07C 5/342; B07C 2501/009; B07C 5/02; B65G 17/16; B65G 17/24; B65G 17/36;
(Continued)

(56) References Cited

U.S. PATENT DOCUMENTS 4,726,898 A * 2/1988 Mills ...................... B65G 47/24
209/939
5,244,100 A    9/1993 Regier et al.
(Continued)

FOREIGN PATENT DOCUMENTS

EP    1083008 B1    4/2003
FR    2953495 A1    6/2011
(Continued)

OTHER PUBLICATIONS

Ericson Salindo; International Search Report and Written Opinion of the International Searching Authority; International Application No. PCT/AU2022/050597; Aug. 30, 2022; Australian Patent Office; Woden, ACT, Australia.
(Continued)

*Primary Examiner* — Mark A Deuble
(74) *Attorney, Agent, or Firm* — Stevens & Showalter LLP (57) ABSTRACT

Fruit sorting equipment comprising interlinked carriages forming a conveyor driven in a conveying loop, each carriage having a fruit carrier attached to the carriage to pivot about a pivot axis, each carrier supporting two longitudinally spaced pairs of axially rotatable rollers that support the fruit above the carrier, and driving means to cause the rollers to axially rotate.

20 Claims, 10 Drawing Sheets

(51) Int. Cl.
*B65G 17/16* (2006.01)
*B65G 17/24* (2006.01)
*B65G 17/36* (2006.01)
*B65G 47/244* (2006.01)

(52) U.S. Cl.
CPC ............ *B65G 17/36* (2013.01); *B65G 47/244* (2013.01); *B07C 2501/009* (2013.01); *B65G 2201/0211* (2013.01)

(58) Field of Classification Search
CPC .......... B65G 47/244; B65G 2201/0211; B65G 47/252; B65G 47/38; B65G 47/965; B65G 2203/0225; B65G 2203/0258
See application file for complete search history.

(56) References Cited

U.S. PATENT DOCUMENTS

| | | | | |
|---|---|---|---|---|
| 5,677,516 | A * | 10/1997 | Leverett | B07C 5/36 177/52 |
| 5,878,863 | A * | 3/1999 | Madden | B65G 47/965 209/912 |
| 6,079,542 | A * | 6/2000 | Blood | B07C 5/342 198/384 |
| 8,746,435 | B2 * | 6/2014 | Nijland | B07C 5/18 198/370.09 |
| 9,475,643 | B1 * | 10/2016 | Odman | B65G 39/20 |
| 9,527,680 | B2 * | 12/2016 | Anstis | B65G 47/962 |
| 12,110,185 | B2 * | 10/2024 | Xu | B65G 17/32 |
| 2011/0309004 | A1 | 12/2011 | Morley | |

FOREIGN PATENT DOCUMENTS

| | | | |
|---|---|---|---|
| WO | 2013131141 A1 | | 9/2013 |
| WO | WO-2017068534 A1 | * | 4/2017 |
| WO | 2017144164 A1 | | 8/2017 |

OTHER PUBLICATIONS

Waldstein, Martin; Extended European Search Report dated Mar. 14, 2025; European Application No. 22823684.0; European Patent Office; Munich, Germany.

* cited by examiner

Section AA

FRUIT SORTING EQUIPMENT

INTRODUCTION

This invention relates to fruit sorting equipment and, in particular, relates to a conveyor system which carries fruit for sorting.

BACKGROUND OF THE INVENTION

Fruit sorting equipment carries fruit on a conveyor system whereby the fruit is rotated past a photographic zone, weighed at a weighing zone and then ejected into appropriately positioned bins in dependence on the characteristics of the fruit as determined by the images taken at the photographic zone and the weight recorded at the weighing zone.

Fruit sorting equipment is also used in automated packing stations where the fruit are orientated in a particular manner to ensure desirable characteristics like blush are visible to the potential customer. There is also a trend to ensure stalks of the fruit are aligned for better presentation.

Equipment of this kind usually utilises a series of carriages which are clipped onto a chain driven by sprockets. The carriages carry cups which support the fruit. A series of rotating rollers are arranged to rotate the fruit clear of the cups through a photographic zone. The fruit is then carried by the cups over a weighing zone in which the weight of each fruit is monitored. The cups are usually designed to pivot outwardly to cause the fruit to be ejected at appropriate positions along the conveyor determined by a computer that stores the data from the photographic and weighing zones. Equipment of this kind is very complex and thus expensive. The timing of the operation of components of equipment is critical and thus setting up the equipment is a lengthy operation for a skilled individual.

Some fruit, especially pears, are difficult to align in the cups in a manner that they can be axially rotated past the camera. Pears also have relatively tough stalks that can catch in the conveyor causing catastrophic jambs.

In automatic packing stations there is often a requirement for the fruit to be aligned uniformly both with respect to the direction of the stalks and presentation of the fruit.

It is these issues that have brought about the present invention.

SUMMARY OF THE INVENTION

According to one aspect of the present invention fruit sorting equipment comprises interlinked carriages forming a conveyor driven in a conveying loop, each carriage having a fruit carrier attached to the carriage to pivot about a pivot axis, each carrier supporting two longitudinally spaced pairs of axially rotatable rollers that support the fruit above the carrier, and driving means to cause the rollers to axially rotate.

In another aspect the present invention also provides fruit sorting equipment comprising interlinked carriages forming a conveyor driven in a conveying loop, each carriage having a fruit carrier attached to the carriage to pivot about a pivot axis that is longitudinal to the conveyor, each carrier supporting a roller assembly comprising axially rotatable rollers that support the fruit above the carrier, and driving means to cause the rollers to axially rotate at different speeds and/or different rotational directions allowing for re-orientation of fruit.

The term fruit as used herein embraces, part spherical fruit and vegetables such as citrus fruits, apples, potatoes, tomatoes, and like shaped articles. The term fruit also embraces less spherical objects such as pears, capsicums and similar shaped fruit or vegetables.

The driving means may be a drive member having a friction surface that engages the underside of the roller to impart rotation to the roller as the conveyor moves across the surface. The friction surface may be stationary or a driven surface such as a belt or chain. In a preferred embodiment each carrier has two longitudinally spaced pairs of rollers, each roller being free to axially rotate relative to the carrier.

Preferably the driving means comprises two longitudinally spaced pairs of belts. The first pair of belts engaging the underside of the rollers at the start of the conveyor to cause rotation of the rollers on each side of the carrier and a second pair of belts positioned downstream of the first pair to engage rollers on each carrier to cause rotation of the rollers under an overhead camera.

Preferably each carriage comprises a central link with a laterally extending arm pivotally secured to each side of the link, each arm pivotally supporting a carrier.

DESCRIPTION OF THE DRAWINGS

Embodiments of the present invention will now be described, by way of example only, with reference to the accompanying drawings in which.

DESCRIPTION OF THE PREFERRED EMBODIMENTS

The fruit sorting equipment illustrated in the accompanying drawings comprises a conveyor 10 shown in FIGS. 1 to 4, formed by a series of interlinked carriages 50 that form a closed loop supported by beams 11 and 12. The closed loop is oriented vertically so that a fruit supporting part of the carriage is positioned above a return part of the conveyor. The carriages are plastic mouldings pivotally interlinked and are driven by a drive sprocket 13 at a far end with an idler sprocket 14 at the infeed end to form moving conveyor 10. The carriages 50 define two parallel lines of fruit. While the described embodiment describes two parallel lines of fruit the carriages could simply be configured to define one line of fruit to be moved along the conveyor, whether that line of carriages is positioned to one side or centrally of the conveyor. Fruit F are fed down chutes 15 at the infeed end to a loading zone 16, to then pass to a photographic zone 17 and a weighing zone 18 to finally an ejection zone 19 in which the fruit are ejected into collection chutes 20.

Figure 5:
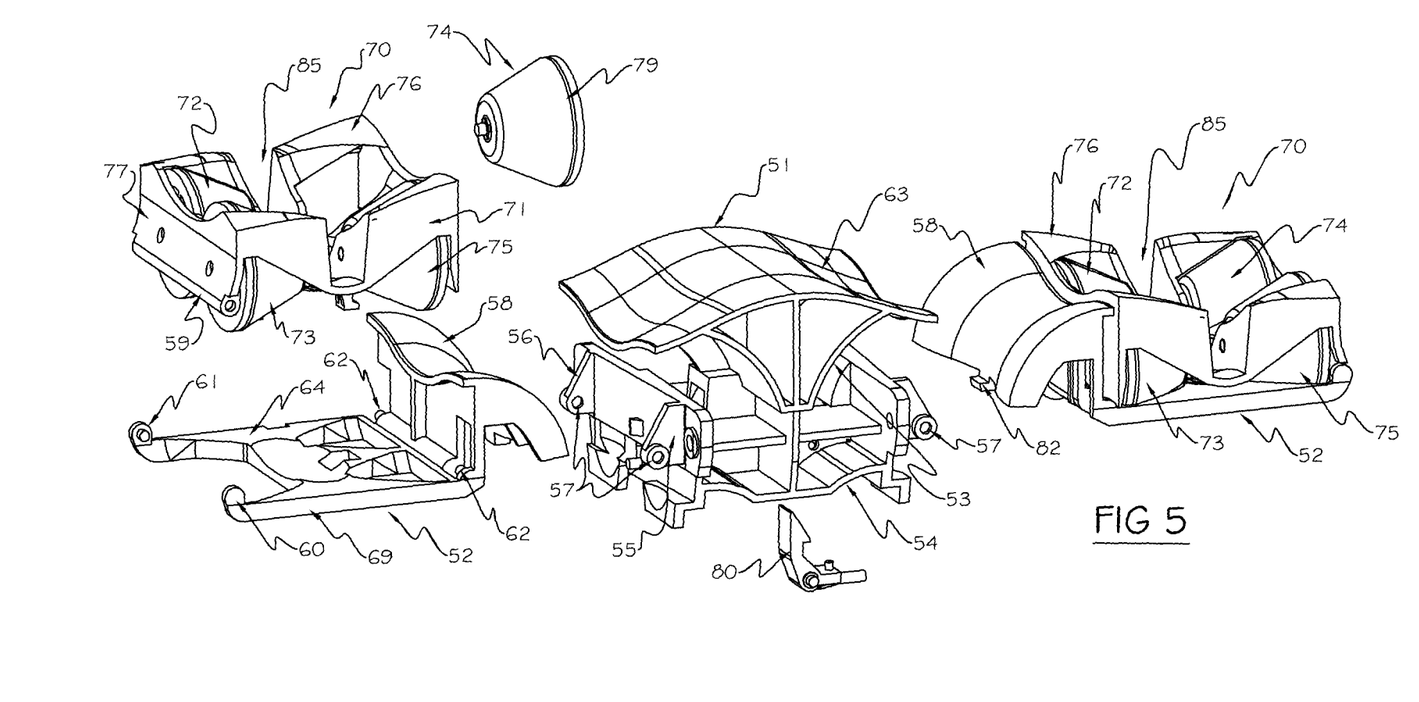
FIG. 5 is an exploded isometric view of components of a carrier and carriage assembly.

As shown in FIG. 5 each carriage 50 comprises a central link 51 which pivotally supports an arm 52 on each lateral side of the central link 51 with respect to the conveying direction (longitudinal) of the conveyor 10. Each arm 52 has a base frame 69 which supports a carrier and roller assembly 70. The link 51 has a curved roof 63 supported by a web 53 extending from a base frame 54 that is supported by the beam 11 of the conveyor 10. Each side of the frame 54 has outwardly projecting flanges 55, 56 with axially aligned apertures 57 that locate pivot pins 62 on the base frame 69 of the arm 52. A curved skirt 58 extends across the inner side of the arm 52. The pivot pins 62 allow the arm to pivot through approximately 90 degrees relative to the link 51, or as far as required to tip fruit off the carriage at the ejection zone.

The carrier is attached to the carriage at a pivot axis that is longitudinally aligned to the conveyer direction. Foreseeably, there may be designs of carrier and carriage attachments where the pivot axis is not longitudinal to the conveyor, but may be perpendicular, or even angled to the conveyor. Such designs would still achieve the same outcome of the carrier pivoting relative to the carriage in order to tip fruit from the conveyor. For example, the carrier could be attached to pivot on a support rod that protrudes outwardly of the central link in a direction perpendicular to the direction of travel of the conveyor. By this design, the carrier would pivot perpendicularly to the conveyor in order to tip fruit from the conveyor.

The planar base 69 of the arm has laterally projecting feet 60, 61. The base 69 supports the carrier and roller assembly 70 with one edge 59 pivotally secured to the feet 60, 61. This allows the carrier and roller assembly 70 to lift a short distance off the arm 52.

The carrier and roller assembly 70 comprises a frame 71 that supports four longitudinally and transversely spaced frustoconical rollers 72 to 75. The rollers 72 to 75 are free to axially rotate and are frustoconical with their peripheries 79 tapering towards the centre of the frame 71. The rollers protrude through the bottom surface of the carrier. The frame 71 has a curved upper surface 76 slightly below the height of the rollers 72 to 75. The curved surface 76 defines a depression 85 into which a single piece of fruit can descend. The movement of the rollers 72 to 75 is used to rotate and re-orientate the fruit.

Figure 7:
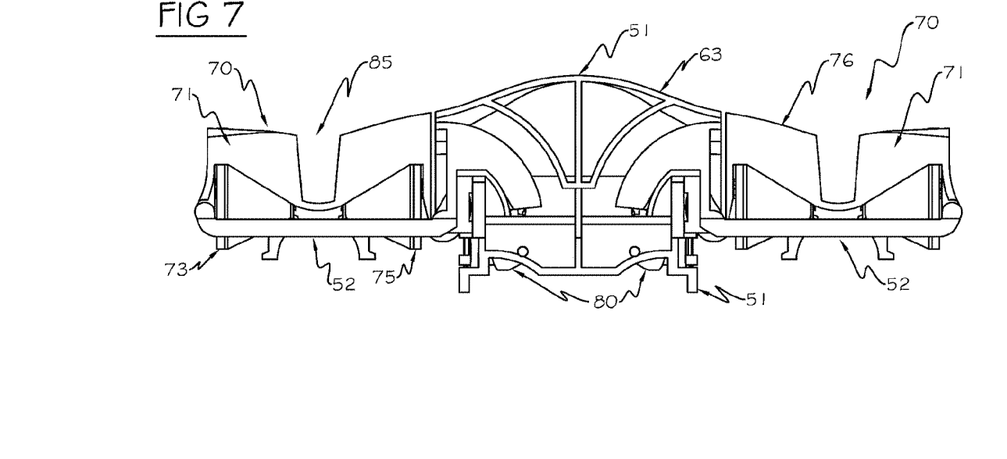
FIG. 7 is a side view of the assembly.
Figure 8:
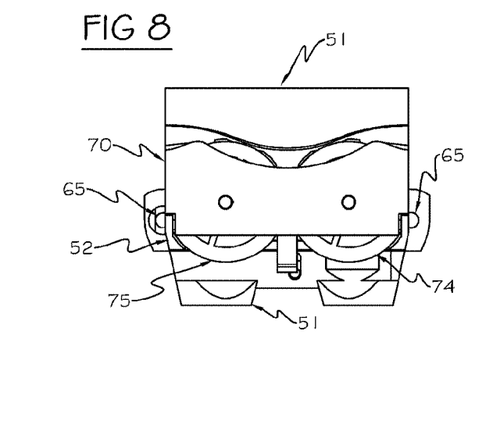
FIG. 8 is an end view of the assembly.
Figure 9:
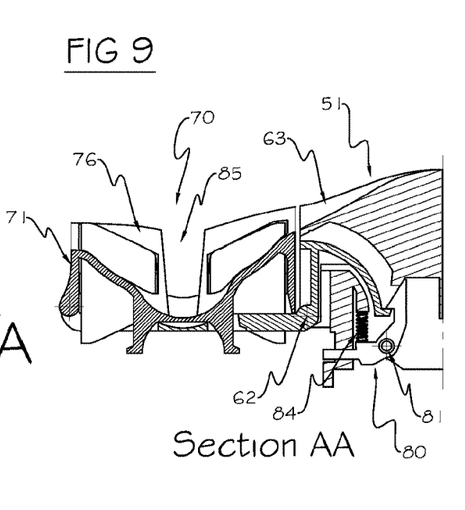
FIG. 9 is a sectional view along the lines AA of FIG. 6.

As shown in FIGS. 7 and 8 the curved roof 63 of the link 51 is above the curved surface 76 of the frame 71 of the carrier 70 so that fruit descends under gravity into the depression 85 defined by the carrier frame 71. Furthermore the depression 85 holds a single piece of fruit and the curved surface 76 ensures fruit cannot locate between adjacent carriers.

An outer flange 77 of the base frame 71 is pivotally secured via edge 59 to the feet 60, 61 of the arm 52. The carrier and roller assembly 70 rests on the arm 52 which is supported by the link 51 in a cantilever fashion. A spring-loaded catch 80 is used to hold the carrier 70 in the horizontal position shown in FIGS. 6 to 9. When the catch 80 is released the weight of the carrier 70 causes the carrier 70 and arm 52 to pivot down through approximately 90 degrees as shown in FIGS. 17 and 18.

Figure 17:
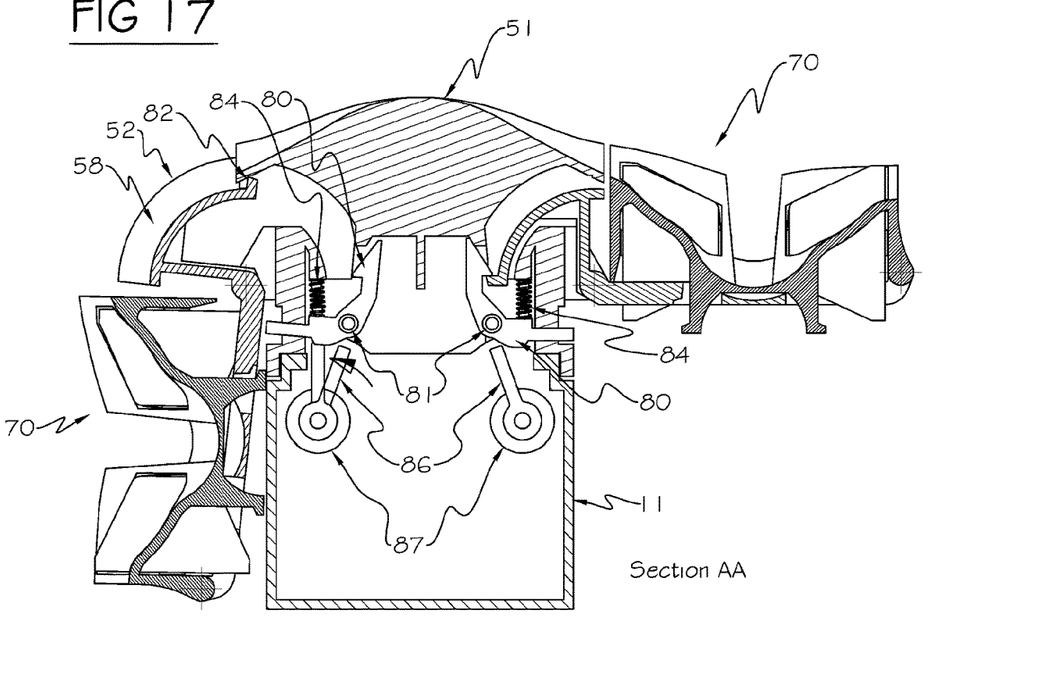
FIG. 17 is a sectional view of the carrier assembly in the tipped configuration.
Figure 18:
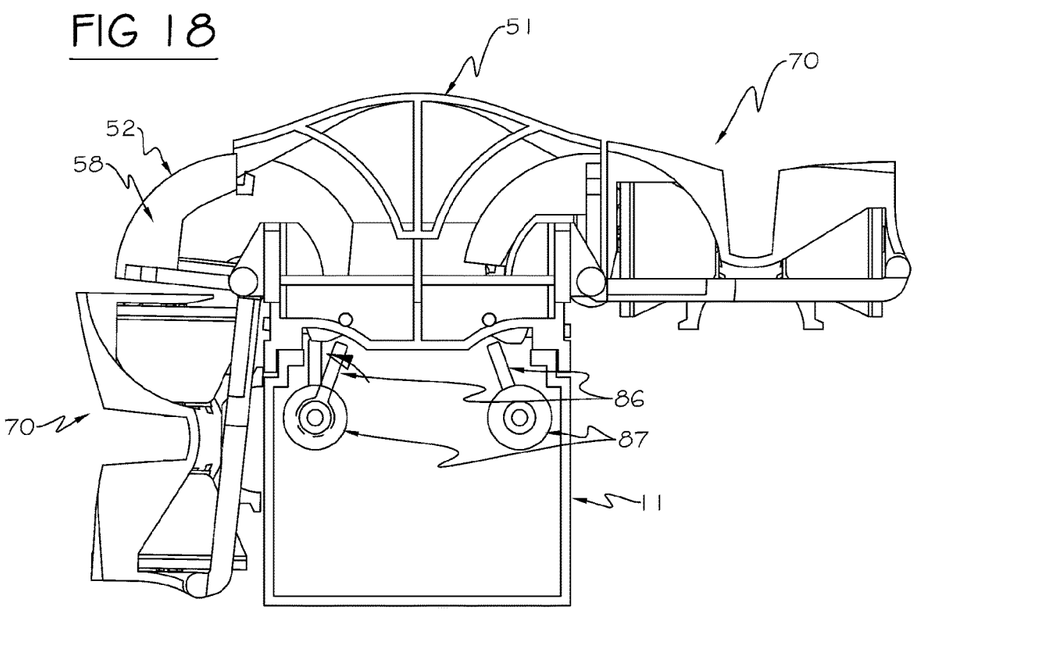
FIG. 18 is an end view of a carrier assembly in a tipped configuration.

As shown in FIG. 17 the catch 80 is fitted to the link 51 via pivot pins 81 and engages with an extension 82 of the arm to hold the arm and carrier and roller assembly in a horizontal position during loading, inspection, weighing and then release the arm when required at ejection. Actuation of the catch 80 is via a solenoid arm 86 mounted on the beam 11. The catch 80 is restrained in the latched position via a small spring 84.

Figure 10:
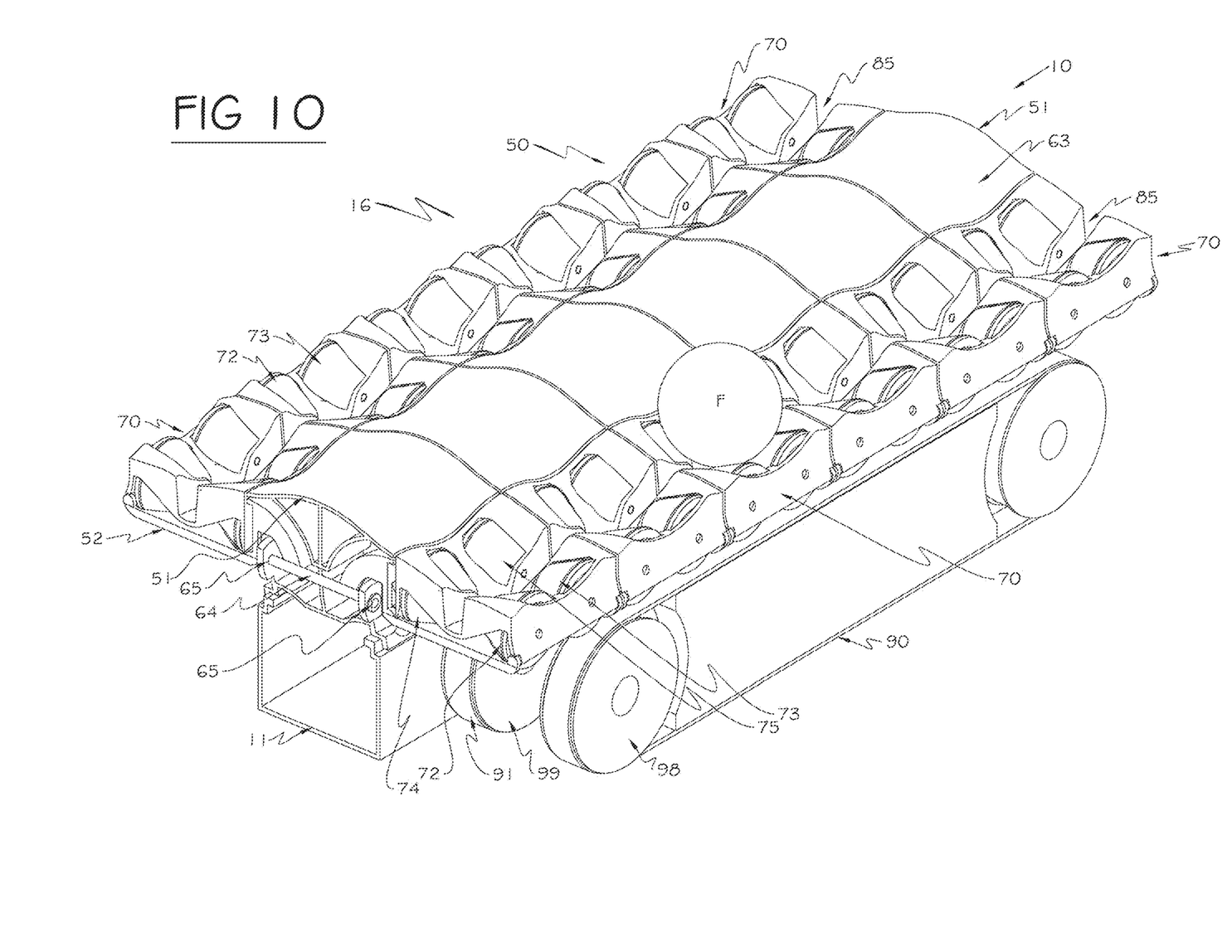
FIG. 10 is an isometric view of a loading zone of the conveyor.

As shown in FIG. 10 the carriages 50 are pivotally interlinked via pins 64 through aligned holes 65 at each end of link 51 to form a continuous conveyor 10. The curved upper surface 76 of each carrier frame 71 and roof 63 of the link 51 are shaped to define smooth virtually unbroken surfaces merging into the depression 85 into which the fruit F locate resting on the roller peripheries 79. The virtually unbroken surfaces ensure that there is little opportunity for stalks to catch in the componentry. When the carriers 70 are tipped as shown in FIG. 17 the trailing curved skirt 58 of the arm 52 is shaped to define a curved surface against the roof 63 of the link 51 again reducing the likelihood of stalks catching in the componentry.

Operation of the Conveyor

Figure 1:
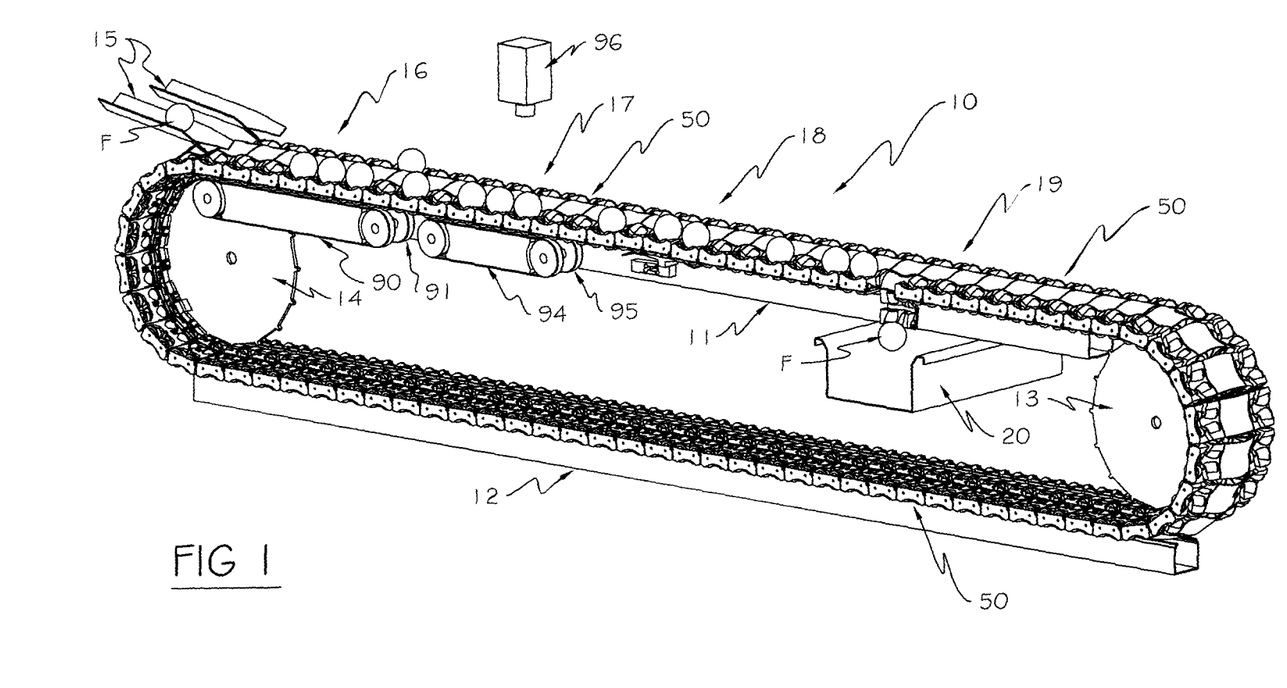
FIG. 1 is an isometric view of a fruit sorting conveyor in accordance with an embodiment of the present invention.
Figure 2:
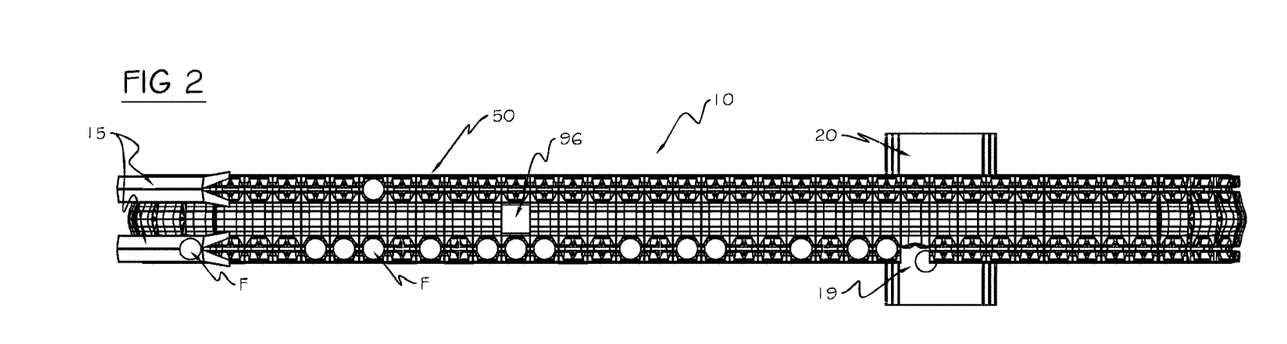
FIG. 2 is a plan view of the conveyor.
Figure 3:
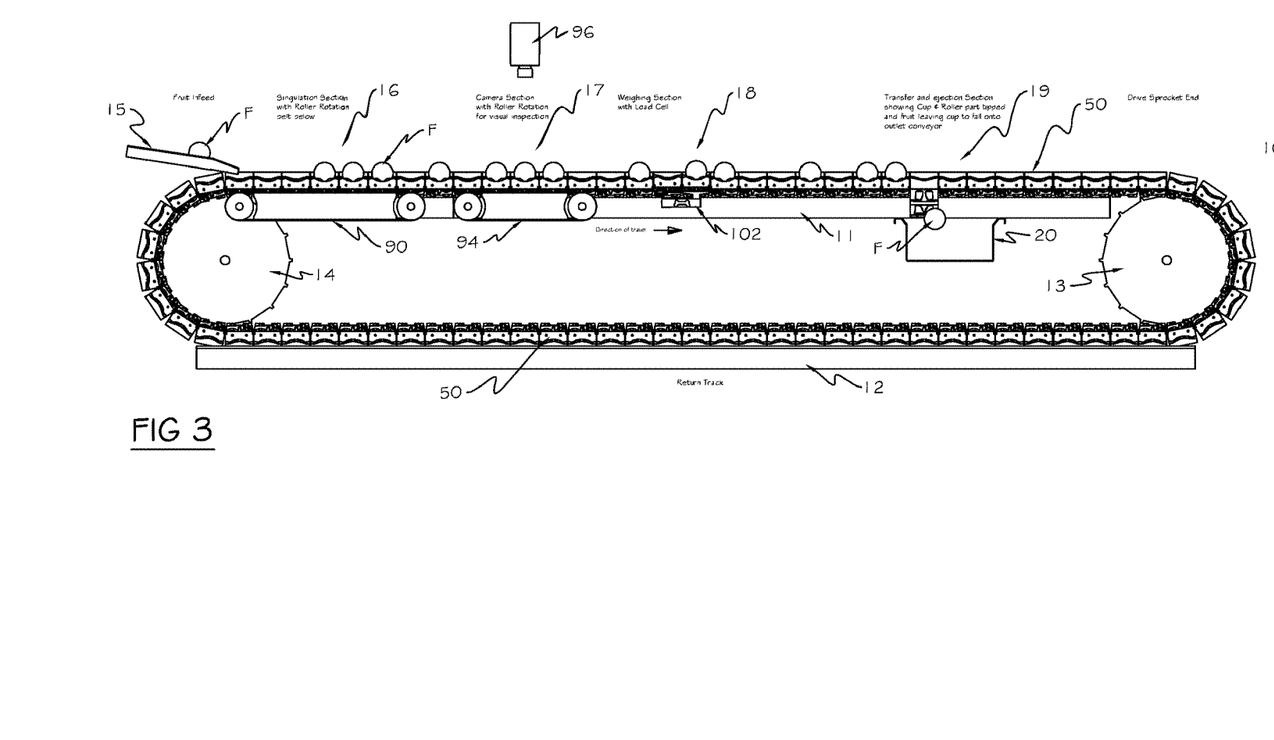
FIG. 3 is a side elevation of the conveyor.
Figure 4:
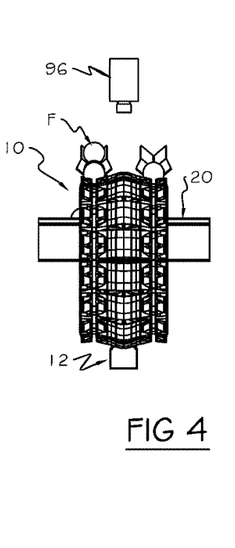
FIG. 4 is an end elevation of the conveyor.

As shown in FIG. 1 the conveyor 10 starts with a loading zone 16 that merges with a photographic zone 17 to a weighing zone 18 and finally to an ejection zone 19 where the fruit are discharged for collection in appropriate bins.

Loading Zone

Figure 11:
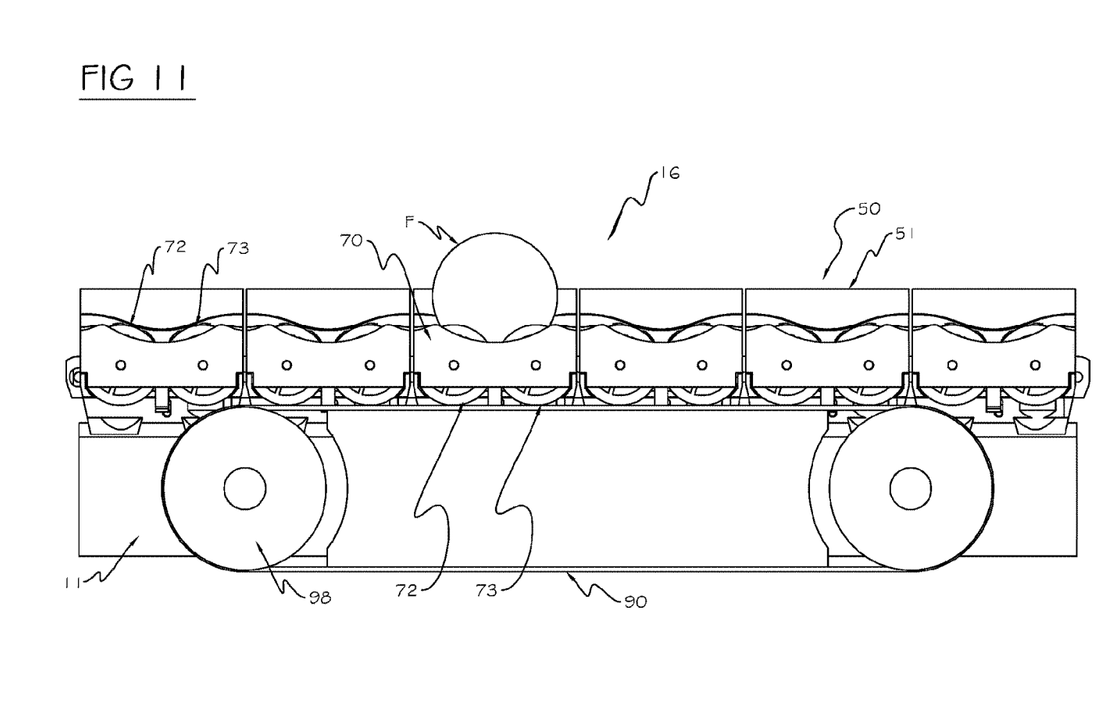
FIG. 11 is a side view of the loading zone.
Figure 12:
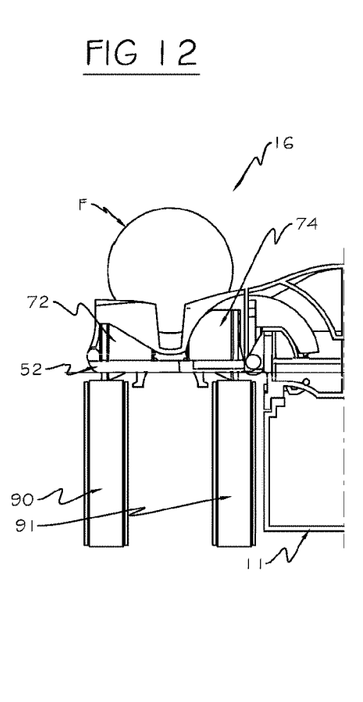
FIG. 12 is an end view of the loading zone.

Details of the loading zone 16 are shown in FIGS. 10 to 12. Continuous friction belts 90, 91 span a section of carriages and are positioned under the outer edge of the carriage rollers 72, 73 and 74, 75 in the carrier and roller assembly 70 on each side of the central link 51. Electrically driven sprockets 98, 99 drive the belts 90, 91 and the belt speeds are controlled to vary the speed and if necessary the direction of rotation of the belts thus varying the speed and direction of rotation of the opposed rollers 72, 73 and 74, 75. The speed and direction variability is selected to cause the fruit to singulate and rotate to the desired orientation, which in the case of pears, is with their longitudinal axis transverse to the conveying direction. Accordingly, the pairs of rollers 72, 73 and 74, 75 can be independently driven by the driving means of belts 90, 91 to rotate at different speeds and/or in opposite rotational directions in order to rotate the fruit about a vertical axis on the carrier and roller assembly 70 into the desired position ready for photographing and/or packing.

Figure 6:
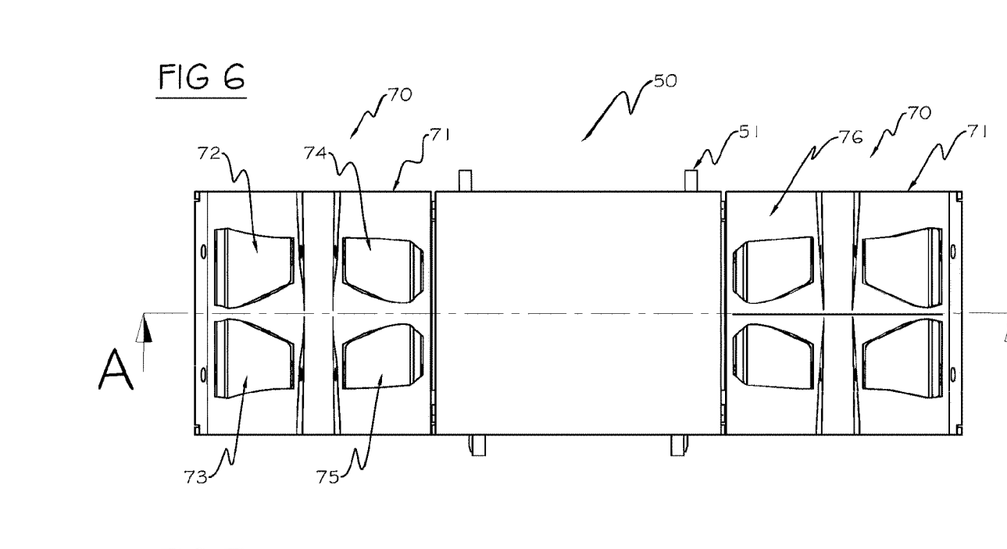
FIG. 6 is a plan view of the carrier and carriage assembly.

A particular feature of the conveyor 10 is the rollers 72-75 being separate on the left hand and right hand sides of the carrier frame 71 (when viewed from the direction shown in, for example, FIG. 6). This allows the use of two roller rotation belts 90, 91 below the carrier and roller assembly 70 which gives the additional ability to rotate the fruit around a vertical axis by varying the speed differential between the two belts.

Photographic Zone

Once the fruit are singulated and orientated by the first set of belts 90, 91 the second set of driven belts 94, 95 rotate the fruit under a camera 96 in the photographic zone 17. The second set of belts 94, 95 are positioned under the rollers 72, 73 and 74, 75 to cause rotation of the rollers due to the speed differential between the belts 94, 95 and the conveyor 10. This differential is adjustable to ensure comprehensive photography of the fruit. Each roller 72 to 75 is over-moulded in soft rubber to increase the friction between the belts and the rollers and to protect the fruit from bruising.

Weighing Zone

Figure 13:
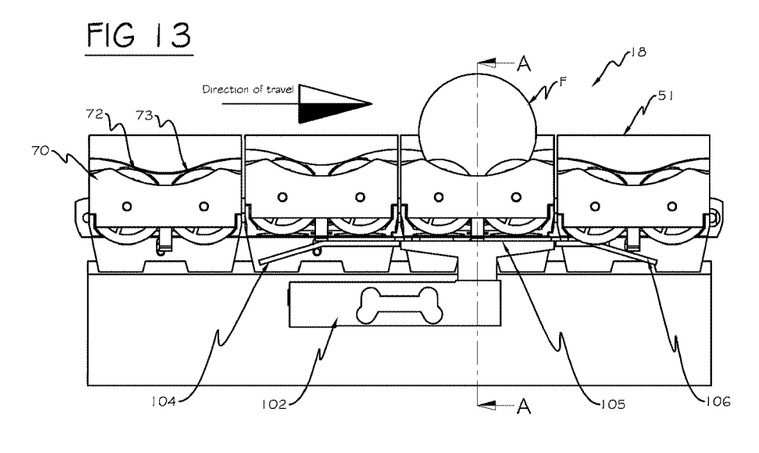
FIG. 13 is a side view of the conveyor at a weighing zone.
Figure 14:
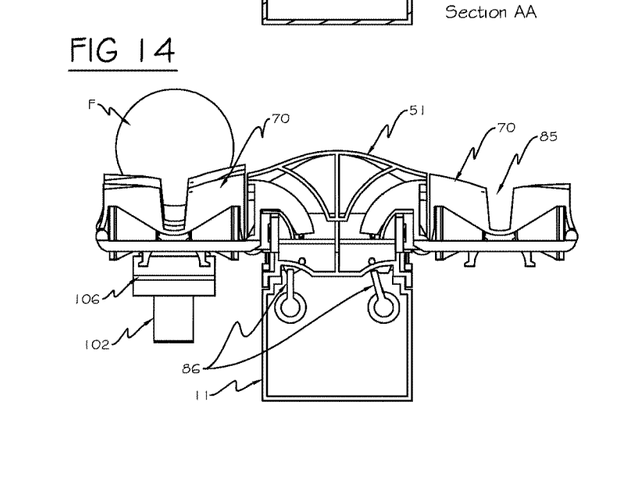
FIG. 14 is an end view of the conveyor at the weighing zone.
Figures 15, 16:
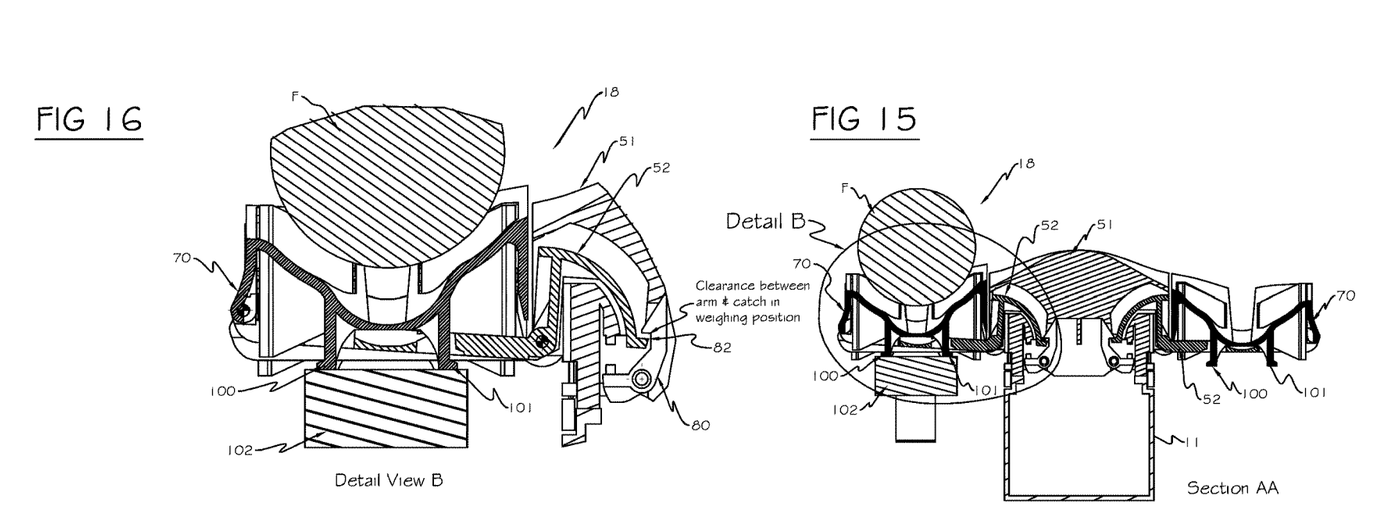
FIG. 15 is a sectional view along the lines AA of FIG. 13.
FIG. 16 is an enlarged view of detail B in FIG. 15.

Once the fruit are past the photographic zone 17 the rollers 72 to 75 are conveyed off the belts 94, 95 to become stationary. The fruit then moves to the weighing zone 18 shown in detail in FIGS. 13 to 16. As described earlier, each carrier and roller assembly 70 is pivotally secured to the outer edge of the arm 52 and the inner edge of the arm 52 is pivotally secured to the link 51 to allow the arm 52 and the carrier and roller assembly 70 to lift slightly relative to the link 51 as the conveyor moves over a small ramp 104 shown in FIG. 13. The carrier frame 71 has two downwardly extending lateral spaced feet 100, 101 that ride up onto a load cell 102 under the conveyor 10. The two feet 100, 101 keep the assembly horizontal in one axis as it travels up the ramp 104, over a weighing plate 105 which is attached to the load cell 102. The assembly then descends down a trailing ramp 106. The parallel pivots between the link 51 and the arm 52, and the arm 52 and the carrier 70 restrain the carrier and roller assembly 70 horizontally in the opposite axis thereby allowing free vertical travel for weighing. The pivots are specifically designed to minimise vertical travel friction. The vertical travel creates a gap between the extension 82 on the arm 52 and the release catch 80 and also the inner edge of the carrier where it rests on the arm (see FIG. 16). This provides an accurate weighing result.

Ejection Zone

Once the fruit F has gone past the weighing zone 18, they reach an ejection zone 19 for ejection in dependence on size, weight and other characteristics such as colour, shape and blemishes. A computer (not shown) monitors these variables and sends a signal to solenoids 87 positioned under the conveyor 10 on each side as shown in FIGS. 17 and 18. The solenoids have arms 86 that engage and release the catch 80 to cause the carrier and roll assembly 70 and arm 52 to fall down by gravity through approximately 90 degrees to the tipped position shown in FIGS. 17 and 18, thus causing ejection of the fruit into the chute 20 to be transferred to appropriate storage bins (not shown).

Figures 19, 20, 21:
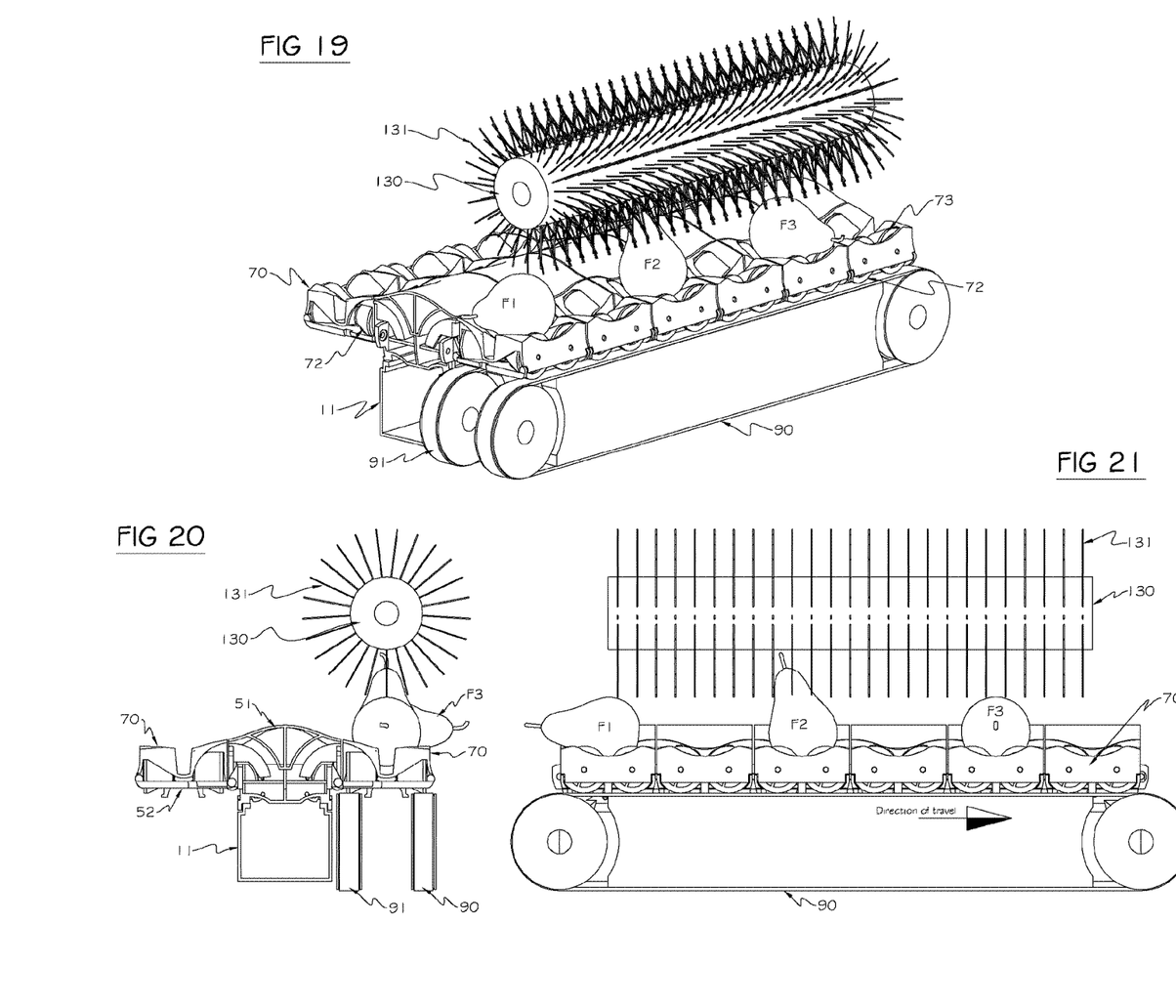
FIG. 19 is a perspective view of part of the conveyor at the loading zone illustrating an overhead rotating brush.
FIG. 20 is an end view of the part shown in FIG. 19.
FIG. 21 is a side elevational view of the part shown in FIG. 19.

In the embodiment shown in FIGS. 19 to 21 a soft cylindrical brush 130 is positioned over the carriages 50 in the loading zone 16. The brush 130 has its longitudinal axis parallel to the direction of travel of the conveyor 10. As shown in FIG. 20 which illustrates pears as the fruit F, the brush 130 is driven to rotate quickly about its axis so that the soft bristles 131 move perpendicular to the direction of the conveyor. If the two roller belts 90, 91 below the carriers 70 are travelling at the same speed and slightly faster than the conveyor 10 then this will rotate the rollers 72-75 in the carrier 70 causing the fruit (pears) in the position shown as $F_1$ (from left) namely lying down parallel with the conveyor with a trailing stalk, to an upright position shown as $F_2$. As the fruit stands up the upper half of the fruit and stalk comes into contact with the soft bristles 131 of the rotating brush 130. The force of the brush pushes the top of the fruit sideways causing the fruit to assume the desired position of $F_3$ namely, lying down with the fruit's longitudinal axis approximately horizontal and perpendicular to the conveyor direction of travel. This is the ideal position for rotation of the fruit past the camera in the photographic zone.

Figure 22:
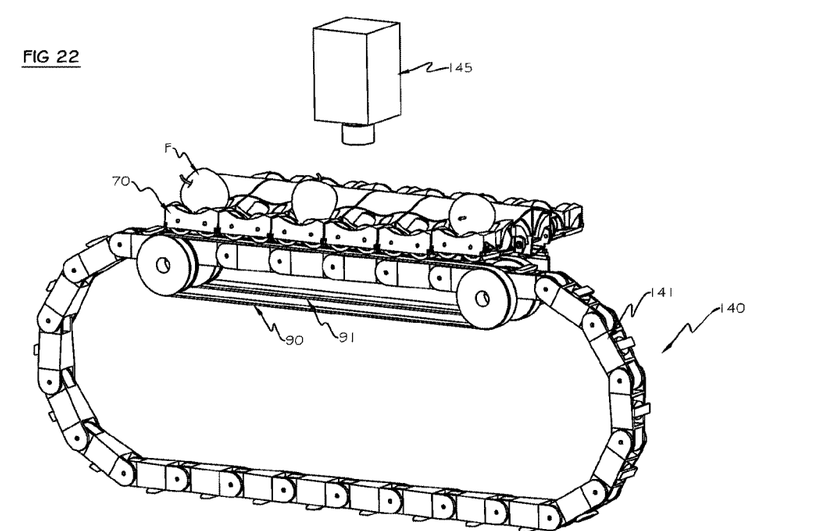
FIG. 22 is a perspective view of the loading zone illustrating the use of a solenoid chain.
Figure 23:
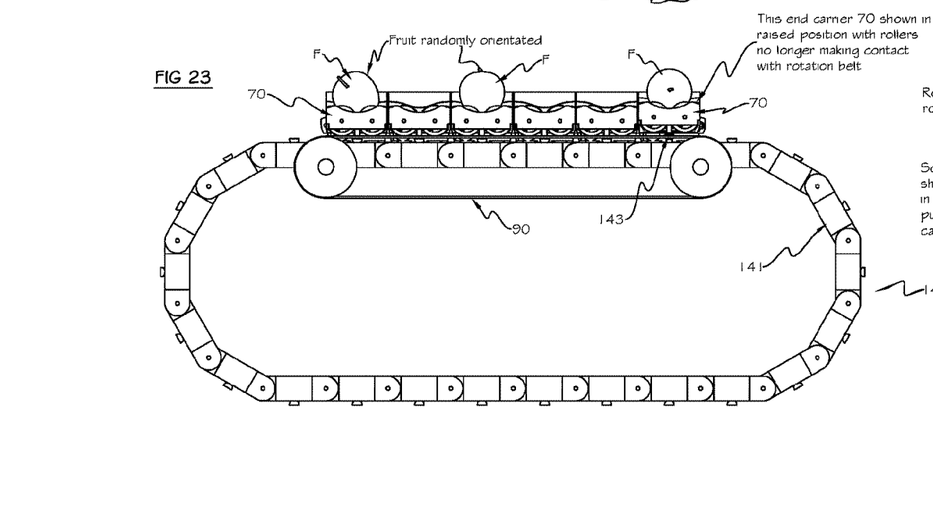
FIG. 23 is a side elevational view of the loading zone.
Figure 24:
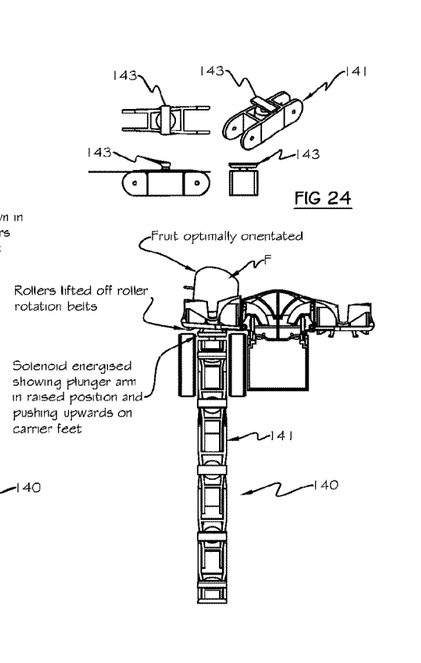
FIG. 24 is an end elevational view of the loading zone.

In another embodiment shown in FIGS. 22 to 24 a solenoid chain 140 is added to the conveyor 10 at the loading zone 16. The solenoid chain 140 is used to lift the carrier 70 and rollers 72-75 off the drive belts 90, 91 when the fruit are in the desired position to stop rotation of the rollers 72-75 and ensure against further movement of the fruit F. Each link 141 of the chain contains a solenoid powered remotely, the solenoid having a plunger 143 that is vertically displaceable to engage the feet 100, 101 on the carrier 70 to lift it slightly so the rollers move clear of the belts 90, 91 and stop rotating.

The solenoid chain 140 is driven by a sprocket (not shown) to run on a guide (also not show) at the same speed as the main conveyor 10 so that the solenoids are aligned directly below the two feet 100, 101 on the underside of each carrier 70. A camera 145 views the fruit and sends a signal to a computer that determines when the fruit are in the preferred optimal position. The computer then activates the solenoid to push the carrier 70 off the belts 90, 91 thereby stopping the rotation of the rollers 72-75 and the fruit. This stopped configuration is shown on the right hand side of FIGS. 22 and 23. As the carriers move off the belts 90, 91 all of the rollers stop rotating.

The rollers are permanently fitted to the carrier 70 and actually become the contact for the fruit for all operations. This contrasts with existing designs where there is a constant meshing and moving apart of carriers and rollers. This carrier and roller design greatly simplifies the design of the conveyor parts and also the complexity of the rest of the equipment.

Once the fruit is settled on the four rollers, the rollers effectively combine both functions of the separate rollers and carriers. In other words, the carrier and roller assembly functions firstly as a roller for the purposes of rotation of the fruit for singulation and for vision inspection and secondly as a carrier for the purposes of weighing, transfer to outlets and ejection of fruit.

Fruit density, in terms of number of fruit items per metre length of conveyor, is not compromised with the described fruit sorting equipment. It is, in fact, comparable to fruit density of known fruit conveyors.

The carrier, in addition to supporting the four rollers, by design of its shape serves to direct the fruit under gravity into the space above the four rollers rather than between this set of four rollers and the next four rollers in the adjacent carriers and helps prevent the fruit collecting in doubles.

The rollers protrude sufficiently above the carrier surface such that they suspend the fruit above the carrier surface. This assists in ease of rotation of the fruit about both horizontal and vertical axes.

The rollers are permanently fitted to the carrier rather than other existing designs where rollers are constantly meshing with the carriers and then and moving apart again. This means that clearances between the roller and the carrier surfaces can be made very small which prevents gaps where stalks and foreign objects can be caught. This should result in less damage and crashes of the machinery.

Two spaced apart pairs of rollers, namely four rollers, have been described in relation to the embodiments presented herein. However, more than two pairs of rollers could foreseeably be incorporated into the fruit sorting equipment for the purpose of supporting larger fruit, such as melons. An additional one, two or more rollers, or pairs of rollers may foreseeably serve to provide for alternative alignment options for fruit rotation around differently aligned axis, or to accommodate differently shaped or sized fruit, such as elongated fruit and vegetables.

Combined with a very curved and organic shape, the carrier and roller assembly provides no surfaces or edges where fruit stalks can catch. This is particularly advantageous when sorting fruit with stiff stalks like pears and capsicums.

Incorporating the rollers into the carrier means that the carrier has become a large squarish shape in plan view, which means that it has been possible to place the pivots for both the arm to link and arm to carrier at close to the four corners, maximising the length between pivots and pins. This helps minimise the effect of friction in the pivots and optimises weighing accuracy.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, namely, to specify the presence of the stated features but not to preclude the presence or addition of further features in various embodiments of the invention.

It is to be understood that the afore going description refers merely to preferred embodiments of invention, and that variations and modifications will be possible thereto without departing from the spirit and scope of the invention, the ambit of which is to be determined from the following claims.

The invention claimed is:

1. Fruit sorting equipment comprising interlinked carriages forming a conveyor driven in a conveying loop to move in a conveying direction, each carriage having a fruit carrier attached to the carriage to pivot about a pivot axis, each carrier supporting two longitudinally spaced pairs of axially rotatable rollers that support the fruit above the carrier, each roller in the pair of rollers having a periphery that tapers downwardly towards a centre of the carrier wherein the fruit is configured to locate on the roller peripheries, and driving means in the form of a continuous belt or chain that spans along the carriages in the conveying direction and engages the underside of at least one of the rollers or at least one of the pairs of rollers to cause the rollers to axially rotate.

2. The fruit sorting equipment according to claim 1, wherein the driving means includes a drive member having a friction surface that engages the underside of at least one of the rollers or at least one of the pairs of rollers to impart rotation to the roller as the conveyor moves across the surface.

3. The fruit sorting equipment according to claim 1, wherein each roller is free to independently axially rotate relative to the carrier.

4. The fruit sorting equipment according to claim 1, wherein the driving means comprises multiple belts to cause independent rotation of multiple rollers on different sides of the carrier.

5. The fruit sorting conveyor according to claim 4 wherein a first pair of belts is positioned at a loading zone of the conveyor to cause rotation of rollers on each carrier, and a second pair of belts is positioned downstream of the first pair to engage rollers on each carrier to cause rotation of the rollers under an overhead camera at a photographic zone of the conveyor.

6. The fruit sorting equipment according to claim 4 wherein a soft rotating brush is positioned above the carriages at the loading zone; and optionally the brush is cylindrical and rotates about an axis longitudinal to the conveyor.

7. The fruit sorting equipment according to claim 4 wherein a lifting mechanism is positioned underneath the carriers in the loading zone to lift the carriers off the drive members and stop rotation of the rollers.

8. The fruit sorting equipment according to claim 7 wherein the lifting mechanism is a chain containing solenoids, the chain being adapted to be driven at the same speed as the conveyor so that each solenoid engages a carrier to lift the carrier.

9. The fruit sorting equipment according to claim 1, wherein each carriage comprises a central link with a laterally extending arm pivotally secured to each side of the link, each arm pivotally supporting a carrier.

10. The fruit sorting equipment according to claim 9 wherein the laterally extending arm pivots downwardly relative to the central link, the laterally extending arm supporting a skirt with a curved upper surface that fills the gap between the upper surface of the carrier and the central link.

11. The fruit sorting equipment according to claim 10 wherein the skirt extends under the roof of the central link when the laterally extending arm and carrier are in an upper fruit carrying position.

12. The fruit sorting equipment according to claim 9 wherein the laterally extending arm is mounted to the central link to pivot about the longitudinal axis, and the carrier is mounted to an outer edge of the laterally extending arm to pivot about the longitudinal axis.

13. The fruit sorting equipment according to claim 1, wherein the carriages define a chain of longitudinally spaced depressions each depression locating a single piece of fruit.

14. The fruit sorting equipment according to claim 13 wherein each carrier has a dished upper surface with the roller peripheries extending above the upper surface.

15. The fruit sorting equipment according to claim 14, wherein each carriage comprises a central link with a laterally extending arm pivotally secured to each side of the link, each laterally extending arm pivotally supporting a carrier, and wherein each central link has a curved roof that smoothly merges with the dished upper surface of the carrier.

16. The fruit sorting equipment according to claim 1, wherein each roller is mounted to the carrier with upper and lower peripheries of the roller extending above an upper surface of the carrier and below a lower surface of the carrier, respectively.

17. The fruit sorting equipment according to claim 1, wherein each roller is frustoconical.

18. The fruit sorting equipment according to claim 1, wherein each of the rollers are mounted with a rotatable axis oriented perpendicular to the conveying direction.

19. Fruit sorting equipment comprising interlinked carriages forming a conveyor driven in a conveying loop to move in a conveying direction, each carriage having a fruit carrier attached to the carriage to pivot about a pivot axis that is longitudinal to the conveyor, each carrier supporting a roller assembly comprising axially rotatable rollers that support the fruit above the carrier, each roller in the pair of rollers having a periphery that tapers downwardly towards a centre of the carrier wherein the fruit is configured to locate on the roller peripheries, and driving means in the form of a continuous belt or chain that spans along the carriages in the conveying direction and engages the underside of at least one of the rollers or at least one of the pairs of rollers to cause the rollers to axially rotate at different speeds and/or different rotational directions allowing for re-orientation of fruit.

20. A fruit carrier for a carriage, wherein interlinked carriages form a conveyor for fruit sorting that is driven in a conveying direction, the fruit carrier having a frame defining an upper depression adapted to locate a piece of fruit, the frame supporting four axially rotatable frustoconical rollers arranged in two longitudinally spaced pairs of rollers, wherein each roller in the pair of rollers has a periphery that tapers downwardly towards a centre of the carrier, each roller having its periphery extending above the depression to support the piece of fruit located in the depression, and the rollers being driven by a continuous belt or chain that spans along the carriage in the conveying direction and engages the underside of at least one of the rollers or at least one of the pairs of rollers to rotate the roller or rollers about an axis oriented perpendicular to the conveying direction.

* * * * *